Figures 1, 2:
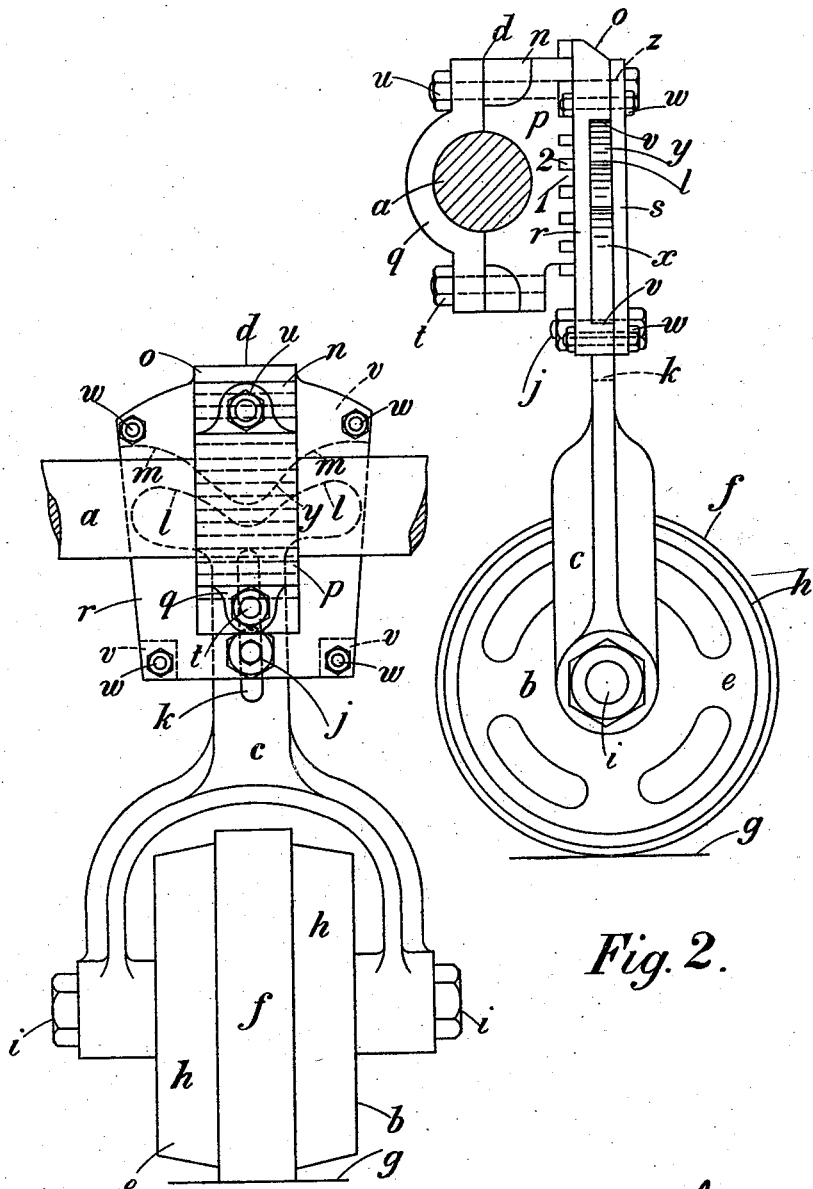

F. G. GARRETT.
NON-SKID DEVICE FOR MOTOR ROAD VEHICLES.
APPLICATION FILED AUG. 3, 1910.

1,001,194.

Patented Aug. 22, 1911.

2 SHEETS—SHEET 1.

Witnesses:
E. R. Peck
L. S. Burket

Inventor:
Frederick G. Garrett

F. G. GARRETT.
NON-SKID DEVICE FOR MOTOR ROAD VEHICLES.
APPLICATION FILED AUG. 3, 1910.

1,001,194.

Patented Aug. 22, 1911.

2 SHEETS—SHEET 2.

Witnesses:
E. R. Peek
S. S. Burket

Inventor:
Frederick G. Garrett
per
Hubert Peek
atty

UNITED STATES PATENT OFFICE.

FREDERICK GEORGE GARRETT, OF SOUTHALL, ENGLAND.

NON-SKID DEVICE FOR MOTOR ROAD-VEHICLES.

1,001,194.     Specification of Letters Patent.     Patented Aug. 22, 1911.

Application filed August 3, 1910. Serial No. 575,365.

*To all whom it may concern:*

Be it known that I, FREDERICK GEORGE GARRETT, subject of the King of Great Britain, residing at 3 Shrubbery road, North Road, Southall, in the county of Middlesex, England, have invented certain new and useful Improvements in Non-Skid Devices for Motor Road-Vehicles, of which the following is a specification, reference being had therein to the accompanying drawings.

My invention relates to a well-known specific form of that likewise well-known generic class of non-skid device for motor road vehicles wherein a trailing wheel of small dimensions, relatively to the vehicle wheels, is so combined with other adjuncts that under normal conditions it runs lightly on the roadway parallel, or substantially parallel, with the vehicle driving wheels, but when the latter skid it operates to relieve such wheels of the static or dead weight of the vehicle and so stop the skidding.

The said specific form to which my invention refers is that comprising a pair of the said small wheels, each of which is revolubly mounted at the end of a bar or lever pivoted on a bracket fixed to the rear axle of the vehicle in proximity to a wheel thereof and having a cam surface for co-acting with a corresponding cam surface furnished at the other end of the bar or lever, which is situated adjacently thereto, the arrangement being such that under normal conditions the small wheel runs on the roadway parallel with the vehicle wheels, but when the latter skid the small wheel and its supporting bar or lever assume an inclined position with regard to the vehicle wheels, whereupon the cam surface of the bar or lever engages with the corresponding surface of the bracket, whereby the small wheel is pressed upon the roadway with the result that eventually the vehicle axle is lifted and thus the skidding is stopped.

Such a device involves a multiple arrangement of its component parts whereby expense and complication ensue, and the main object of my present invention is to obviate such disadvantages, to which end a device embodying same comprises a single wheel with its complementary parts of bar or lever and bracket which I construct and assemble so that the small wheel may tilt at either side of the perpendicular to meet the skidding of the vehicle wheels, while I construct the end of the bar or lever contiguous to the bracket, as well as the latter, with a corresponding pair of cam surfaces for co-acting, a pair at a time, on either tilting of the small wheel.

A further object of my invention is to afford an adjustment of the bracket carrying the device, for, as the distance of the axle from the roadway varies in different types of vehicle, it is very desirable to apply some means in connection with the device for adjusting it to meet such variations. To achieve this I construct the bracket of two or more components, one of which is designed to be secured directly or indirectly to the axle, while the other or another is adapted to carry and co-act with the bar or lever supporting the small wheel, and these two components I connect by inter-locking means furnished on the adjacent portions of the components and of such a character as to enable the component carrying the bar or lever to be raised or lowered relatively to the other component to afford the adjustment, and after adjustment maintain the connection with the aid, if required, of bolts or the like.

The skid device may be constructed so that the small wheel always runs in contact with, or trails upon, the roadway, though it is sometimes desirable that the small wheel should be held out of action, and the accomplishment of this in a simple manner constitutes a further object of my invention. To attain this aim I make the bracket of three components, viz: an axle component, a bar or lever component, and an interposed component, the latter of which I pivot to the former component, and on the face of this interposed component adjacent to the bar or lever component I provide the means for interlocking with the complementary means on such component to afford the adjustment aforementioned, and further, in connection with the interposed component I furnish contrivances for operating it to lift the small wheel from the active position and to restore it to such position.

I will now fully describe my invention with reference to the accompanying drawings wherein:—

Figures 3, 4:
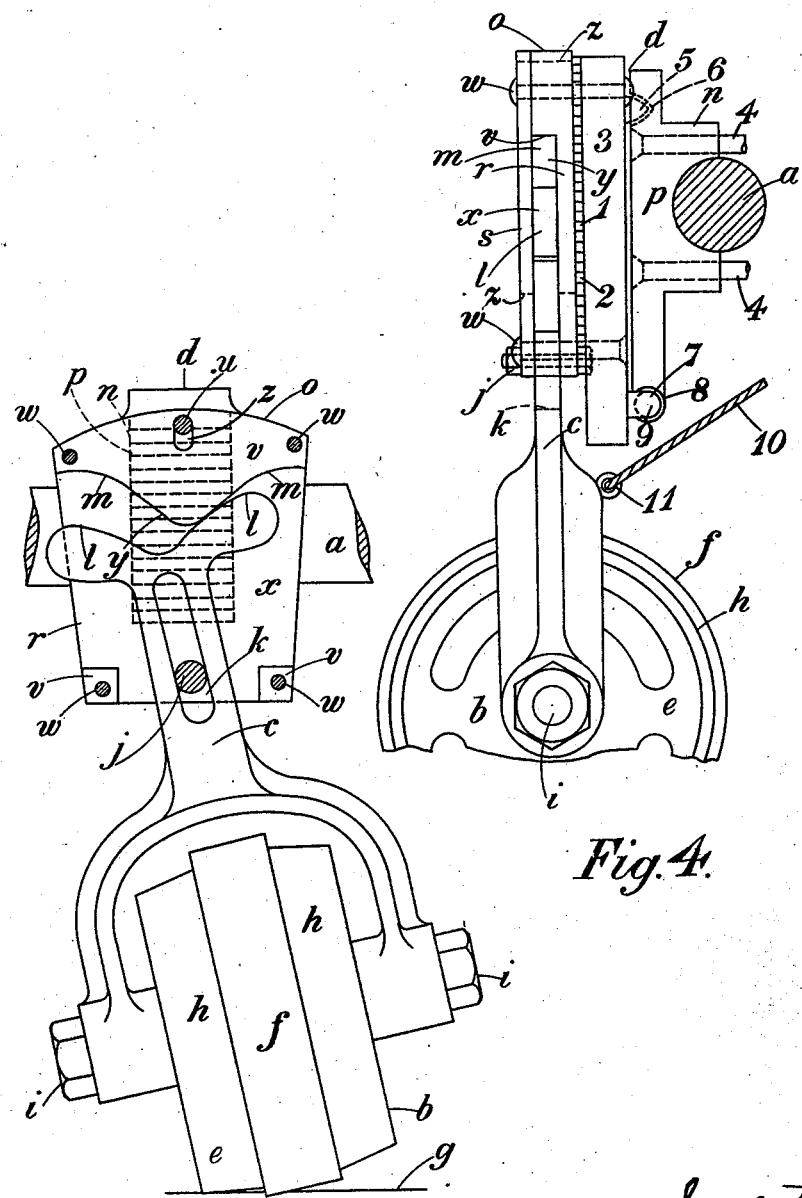

Figure 1 is an end elevation of the device in the normal position with the small wheel adapted to always run, or trail, on the roadway; Fig. 2 is a side elevation thereof; and Fig. 3 is a sectional end elevation of the same illustrating the small wheel in an operative position. Fig. 4 is a side elevation of the device in the normal inactive position and showing the means for lifting and lowering the small wheel with respect to the roadway.

The same letters of reference are used throughout to designate the same parts, and, of them, referring to the several figures generically, $a$ denotes the rear axle of the vehicle carrying (though not shown) a road wheel at each end; $b$ the small wheel of the device; $c$ the bar or lever carrying the wheel $b$; and $d$ the bracket fixed to the axle $a$ and supporting the bar or lever $c$ and, therefore, the wheel $b$ more or less centrally between the road wheels.

The wheel $b$ is of an ordinary type consisting of a metal conical body $e$ with a central rubber tire $f$. Normally, and as usual, the tire $f$ runs on the roadway $g$ as represented in Figs. 1, 2 and 4, but when the wheel $b$ tilts on a skid occurring either lateral portion $h$ of the body $e$ contacts with the roadway as depicted in Fig. 3.

The wheel $b$ is supported at the lower end of the bar or lever $c$ which is forked therefor to carry a spindle $i$ on which the wheel $b$ is revolubly mounted. The upper end of the bar or lever $c$ is situated within the bracket $d$ (whose construction I will specifically describe presently) and at an intermediate point it is pivoted thereto by a bolt $j$ so that it may oscillate laterally as indicated in Fig. 3 to accommodate the skidding, and also move up and down longitudinally to meet inequalities in the roadway $g$ and to adjust itself to its lateral movement, for which purpose the hole for the bolt $j$ is elongated to form a slot $k$. The upper end of the bar or lever $c$ is enlarged and shaped to form two cam surfaces $l, l$, and likewise the contiguous portion of the bracket $d$ is fashioned with corresponding cam surfaces $m, m$.

In use, when the vehicle is proceeding normally the wheel $b$, as illustrated in Figs. 1, 2 and 4, is upright and simply trails along the roadway $g$ and the cam surfaces $l, l$ and $m, m$ of the bar or lever $c$ and bracket $d$ respectively are out of contact, but on the vehicle commencing to skid the wheel $b$ is thrust sidewise together with the bar or lever $c$ by the skidding action so that, as depicted in Fig. 3, the wheel $b$ is no longer vertical but oblique, the lower part being consequently thrown inward and the corresponding portion $h$ brought on to the roadway $g$, and the corresponding complementary cam surfaces $l$ and $m$ being brought into contact, whereby the bar or lever $c$ exerts an upward pressure upon the bracket $d$ thereby causing first the wheel $b$ to be pressed upon the roadway $g$ and eventually the axle $a$ to be lifted, thus increasing the weight upon the wheel $b$ and relieving the vehicle wheels of a small portion of the weight upon them. On the vehicle righting itself, the wheel $b$ and bar or lever $c$ resume their initial positions.

I will now explain the construction of the bracket $d$, referring first to the form illustrated in Figs. 1, 2 and 3. The bracket $d$ comprises two main components $n$ and $o$ and each of these, I, in turn, make in two parts $p, q$ and $r, s$ respectively. Of the two parts $p, q$ of the component $n$ that is secured to the axle $a$, one, $p$, is in the form of a rectangular block recessed at one face to constitute a seat for the axle $a$, while the other part $q$ is correspondingly fashioned to serve as a cap or cover thereto. The two parts $p, q$, are fastened together by a stud $t$ and by a bolt $u$, the latter further aiding in securing this component $n$ to the other $o$ as I will presently explain. The two parts $r$, $s$ of the component $o$ supporting the bar or lever $c$ are likewise of a rectangular contour, and one, $r$, is provided with projections $v$—$v$ upon one face to constitute distance-pieces to which the other part $s$ is bolted as at $w$, which part $s$, consequently, serves as a cover. Thus a space $x$ is obtained between the two parts $r$, $s$, and in it the upper or cam-shaped end $l, l$ of the bar or lever $c$ supporting the small wheel $b$ is situated, the complementary cam surface $m, m$ being provided as a projection $y$ upon the part $r$ having the distance pieces $v$—$v$. Both the parts $r, s$ are also made with a hole for the reception of the pivot $j$ of the bar or lever $c$. Further, both parts $r, s$ are made with an elongated hole $z$ to receive and accommodate the bolt $u$ already mentioned in connection with the other component $n$.

The face of the part $p$ of the axle component $n$ remote from its complementary cap or cover part $q$ is formed or provided with a series of teeth 1 of square section, and the corresponding part $r$ of the bar or lever component $o$ is also furnished with a like series of teeth 2. The purpose of these two series of teeth 1, 2 is to interlock or mesh when the two components $n$ and $o$ are assembled. Now, assuming the parts $p, q$ of one component $n$ and the parts $r, s$ of the other component $o$ are assembled with regard to the axle $a$ and bar or lever $c$ respectively and secured, then they, in turn, are assembled with their toothed faces 1, 2 in engagement, whereupon they are secured by the bolt $u$ mentioned as connecting also the parts $p, q$ of the axle component $n$. Thus by slackening this bolt $u$ and disengaging the toothed faces 1, 2 of the two components $n$ and $o$, the bar or lever component $o$ can be raised or lowered according to the adjustment desired, which will be maintained on reëngaging the toothed faces 1, 2 and tightening the bolt $u$, the elongated hole $z$ of the latter admitting of the requisite manipulation and change of position.

According to a modification, the interlocking means 1, 2 aforesaid may consist of dovetail-shaped tongues and grooves on the bracket components $n$ and $o$ instead of teeth of square section whereby the necessity for connecting the components by a bolt or bolts or the like is avoided as the engagement of the tongues and grooves afford the requisite attachment. Here detachment and adjustment are effected by moving the bar or lever component laterally. It may, however, be convenient to apply a set-bolt or stud to aid in attaching the components.

Reference is now directed to Fig. 4 which illustrates the bracket $d$ modified to meet the requirement of lifting and lowering the wheel $b$ relatively to the roadway $g$ to render it respectively inoperative and operative. Here in addition to the axle component $n$ and the bar or lever component $o$ already explained, I employ another component consisting of a member 3 shaped to correspond with the components $n$ and $o$ between which I arrange it. The component $n$ consists of the two parts $p$ and $q$ constructed and assembled as before, though in this instance they are secured by countersunk bolts 4, 4, while the component $o$ likewise comprises the two parts $r$ and $s$ constructed and assembled as in the other example as will be evident from the reference letters, though the bolts $w$—$w$ as well as connecting the parts $r$ and $s$ serve, too, to attach the component $o$ to the member 3. The part $r$ is provided with the series of teeth 2 as before, but the complementary series 1 instead of being furnished upon the part $p$ of the axle component $n$, is provided upon the face of the member 3 adjoining the part $r$ of the bar or lever component $o$. These two series 1 and 2 operate as, and for the purposes, previously explained, and by their aid in conjunction with the bolts $w$—$w$ the bar or lever, component $o$ and the member 3 are rigidly connected, the holes in the component $o$ for the bolts, of course, being elongated as indicated at $z$ to admit of the adjustment. On the face of the member 3 opposite that on which the series of teeth 1 is situated I furnish a projection or stud 5 for coöperating with a like recess 6 in the contiguous part $p$ of the axle component $n$, and on such face I further furnish an eye or part 7 for a complementary eye or part 8 provided on the axle component $n$ to constitute a pivotal attachment 9. Thus the requisite connection between the member 3 and the axle component $n$ is established.

A wire or the like 10 is attached at 11 to the bar or lever $c$ and its free end is led to any convenient point for operation by suitable means. On operating the wire or the like 10 to raise the wheel $b$, the bar or lever component $o$ of the bracket $d$, with the adjoining or attached member 3, turns on the pivotal connection 9 of the latter with the axle component $n$ and so affords the necessary inoperative position, while on reversing the action the operative position ensues due to the friction between the wheel $b$ and the roadway $g$, which, if necessary, may be aided by a spring or other device applied in any well-known manner.

It will now be manifest that a device constructed as described automatically and effectually prevents skidding without damaging the roadway, while facility for the adjustment to meet different applications is afforded simply though nevertheless effectively, as well as ease for rendering the device active or inactive.

Claims:—

1. A non-skid device for motor road vehicles comprising, in combination, a stationary bracket fixed to the vehicle axle, a straight bar or lever pivoted at an intermediate part of its length to said bracket and transversely of the vehicle, a small wheel revolubly mounted at the lower end of said bar or lever, a pair of independent cam surfaces directly provided on the upper end of said bar or lever and a pair of independent cam surfaces directly provided on said bracket to co-act with said cam surfaces on said bar or lever, substantially as described.

2. A non-skid device for motor road vehicles comprising, in combination, a stationary bracket fixed to the vehicle axle and consisting of sections admitting of adjustment, a bar or lever pivoted at an intermediate part of its length to said bracket and arranged vertically and transversely of the vehicle, a longitudinal slot in said bar or lever about its pivot, a small wheel revolubly mounted at the lower end of said bar or lever, a pair of independent cams integral with the upper end of said bar or lever, and a pair of independent cams integral with said bracket and complementary to said cams on said bar or lever, substantially as described.

3. In a non-skid device for motor road vehicles comprising a small wheel revolubly carried by a bar or lever pivotally supported by a bracket fixed to the vehicle axle and having cam surfaces on the bar or lever and on the bracket for co-acting on the skidding of the vehicle wheels, the construction of the said bracket of components, one of which is directly or indirectly secured to the axle, while the other or another pivotally supports the said bar or lever, and both are connected by interlocking means furnished on the adjacent portions and of such a character as to enable the component supporting the bar or lever to be raised or lowered relatively to the other component to afford vertical adjustment and maintain same.

4. In a non-skid device for motor road vehicles comprising a small wheel revolubly carried by a bar or lever pivotally supported by a bracket fixed to the vehicle axle and consisting of components connected by interlocking means for affording vertical adjustment and having cam surfaces on the bar or lever and on the bracket for co-acting on the skidding of the vehicle, the construction of such bracket of three components, one of which is secured to the axle, another of which pivotally supports the bar or lever, while the other is interposed between these two components and is fastened to the bar or lever component by bolts and by interlocking means affording vertical adjustment, and is pivoted to the axle component so that it may be turned along with the bar or lever component to raise or lower the small wheel with regard to the roadway by a wire or other contrivances to render the wheel incapable, or capable, of action.

5. A non-skid device for motor road vehicles comprising, in combination, a small wheel; a bar or lever revolubly carrying said wheel; a bracket consisting of two components, one of which is fixed to the vehicle axle and is connected to the other component whereto said bar or lever is pivoted; a pair of cam surfaces upon said bar or lever; a pair of complementary cam surfaces upon said component pivotally supporting said bar or lever; a slot in said bar or lever about its pivot for enabling it to adjust itself to lateral oscillation to meet skidding, and to longitudinal movement to meet inequalities in the roadway; and interlocking means on the adjacent portions of said components for admitting of said component supporting said bar or lever being raised and lowered relatively to the other component to afford vertical adjustment and maintain same, substantially as described.

6. A non-skid device for motor road vehicles, comprising, in combination, a small wheel; a bar or lever revolubly carrying said wheel; a bracket consisting of three components whereof one is fixed to the vehicle axle, another pivotally supports said bar or lever, while the other is interposed between said two components and is connected to both; a pair of cam surfaces upon said bar or lever; a pair of complementary cam surfaces upon said component pivotally supporting said bar or lever; a slot in said bar or lever about its pivot for enabling it to adjust itself to lateral oscillation to meet skidding, and to longitudinal movement to meet inequalities in the roadway; interlocking means on the adjacent portions of said component supporting said bar or lever and said interposed component for admitting of said former component being raised and lowered relatively to the other to afford vertical adjustment; means pivotally connecting said interposed component to said component fixed to the vehicle axle so that said interposed component and said component supporting said bar or lever can be turned to raise or lower said small wheel with regard to the roadway; and means for effecting such operation, substantially as described.

In testimony whereof I affix my signature in presence of two witnesses.

FREDERICK GEORGE GARRETT.

Witnesses:
  B. VINOTTNER,
  EDITH GANSEL.

---

Copies of this patent may be obtained for five cents each, by addressing the "Commissioner of Patents, Washington, D. C."